United States Patent
Root et al.

(10) Patent No.: US 10,896,619 B2
(45) Date of Patent: Jan. 19, 2021

(54) POSITION REPORTING AND NAVIGATION IN AN INTEGRATED FLIGHT APPLICATION USING BULLSEYE

(71) Applicant: Foreflight LLC, Houston, TX (US)

(72) Inventors: Travis Scott Clayton Root, Austin, TX (US); Luis Manuel Flores Vasquez, Portland, ME (US)

(73) Assignee: ForeFlight LLC, Houston, TX (US)

( * ) Notice: Subject to any disclaimer, the term of this patent is extended or adjusted under 35 U.S.C. 154(b) by 151 days.

(21) Appl. No.: 16/115,959

(22) Filed: Aug. 29, 2018

(65) Prior Publication Data
US 2020/0074869 A1    Mar. 5, 2020

(51) Int. Cl.
*G08G 5/00* (2006.01)
*G01S 19/51* (2010.01)

(52) U.S. Cl.
CPC ............ *G08G 5/0047* (2013.01); *G01S 19/51* (2013.01); *G08G 5/0004* (2013.01); *G08G 5/0017* (2013.01); *G08G 5/0034* (2013.01)

(58) Field of Classification Search
CPC ...... G08G 5/00; G08G 5/0004; G08G 5/0017; G08G 5/0034; G08G 5/0047; G08G 5/0013; G08G 5/0021; G08G 5/0039; G08G 5/0052; G01S 19/51; G06K 9/32; G06K 9/52; G06T 2207/30048; G06T 7/0012; G06T 7/30
See application file for complete search history.

(56) References Cited

U.S. PATENT DOCUMENTS

| | | | | |
|---|---|---|---|---|
| 5,839,088 A * | 11/1998 | Hancock | ............... | G01C 21/32 701/468 |
| 6,175,801 B1 * | 1/2001 | Millington | ......... | G01C 21/3664 701/428 |
| 7,746,343 B1 * | 6/2010 | Charaniya | ........... | G06F 16/2428 345/428 |
| 2014/0043185 A1 * | 2/2014 | Quellec | ................ | G01S 7/2926 342/146 |

OTHER PUBLICATIONS

Screen captures from YouTube video clip entitled "Basic Bullseye Tutorial; Lockon Flaming Cliffs 1.12," 5min:36sec(5:36), uploaded on Jan. 28, 2010 by user "JediLink25". Retrieved from Internet: <https://www.youtube.com/watch?v=vgcXcfeGb2M>.*
No Author. "Falconpedia Everything you need to know about Falcon 4.0" [online]. Wikidot.com, Aug. 6, 2009 [retrieved on May 8, 2019]. Retrieved from the Internet: <URL:http://falcon4.wikidot.com/concepts:bullseye>.*

\* cited by examiner

*Primary Examiner* — Abdhesh K Jha
(74) *Attorney, Agent, or Firm* — Ferguson Braswell Fraser Kubasta PC

(57) ABSTRACT

Position reporting and navigating using a bullseye in an integrated flight application includes obtaining bullseye coordinates in a map reference frame. The map reference frame is associated with a map of the integrated flight application. Position reporting and navigating using a bullseye in an integrated flight application further includes determining current location coordinates in the map reference frame, rendering the map with the bullseye and a current location indicator superimposed on the map, using the bullseye coordinates and the current location coordinates in the map reference frame, determining the current location coordinates in a bullseye reference frame, and reporting the current location in the bullseye reference frame.

12 Claims, 13 Drawing Sheets

POSITION REPORTING AND NAVIGATION IN AN INTEGRATED FLIGHT APPLICATION USING BULLSEYE

BACKGROUND

Airplane pilots rely on navigation tools in order to determine the location of the plane, locations of other planes, and destinations. A pilot may share the plane's location with others. In certain scenarios, a pilot may desire to share location information while preventing third parties from deciphering the location information.

SUMMARY

In general, in one aspect, one or more embodiments relate to a method for position reporting and navigating using a bullseye in an integrated flight application. The method includes obtaining bullseye coordinates in a map reference frame. The map reference frame is associated with a map of the integrated flight application. The method further includes determining current location coordinates in the map reference frame, rendering the map with the bullseye and a current location indicator superimposed on the map, using the bullseye coordinates and the current location coordinates in the map reference frame, determining the current location coordinates in a bullseye reference frame, and reporting the current location in the bullseye reference frame.

In general, in one aspect, one or more embodiments relate to a system for position reporting and navigating using a bullseye in an integrated flight application. The system includes a computer processor and instructions executing on the computer processor, causing the system to obtain bullseye coordinates in a map reference frame. The map reference frame is associated with a map of the integrated flight application. The instructions further cause the system to determine current location coordinates in the map reference frame, render the map with the bullseye and a current location indicator superimposed on the map, using the bullseye coordinates and the current location coordinates in the map reference frame, determine the current location coordinates in a bullseye reference frame, and report the current location in the bullseye reference frame.

In general, in one aspect, one or more embodiments relate to a non-transitory computer readable medium including computer readable program code for causing a computer system to obtain bullseye coordinates in a map reference frame. The map reference frame is associated with a map of the integrated flight application. the computer readable program code further causes the computer system to determine current location coordinates in the map reference frame, render the map with the bullseye and a current location indicator superimposed on the map, using the bullseye coordinates and the current location coordinates in the map reference frame, determine the current location coordinates in a bullseye reference frame; and report the current location in the bullseye reference frame.

Other aspects of the disclosed invention will be apparent from the following description and the appended claims.

DETAILED DESCRIPTION

Figure 1:
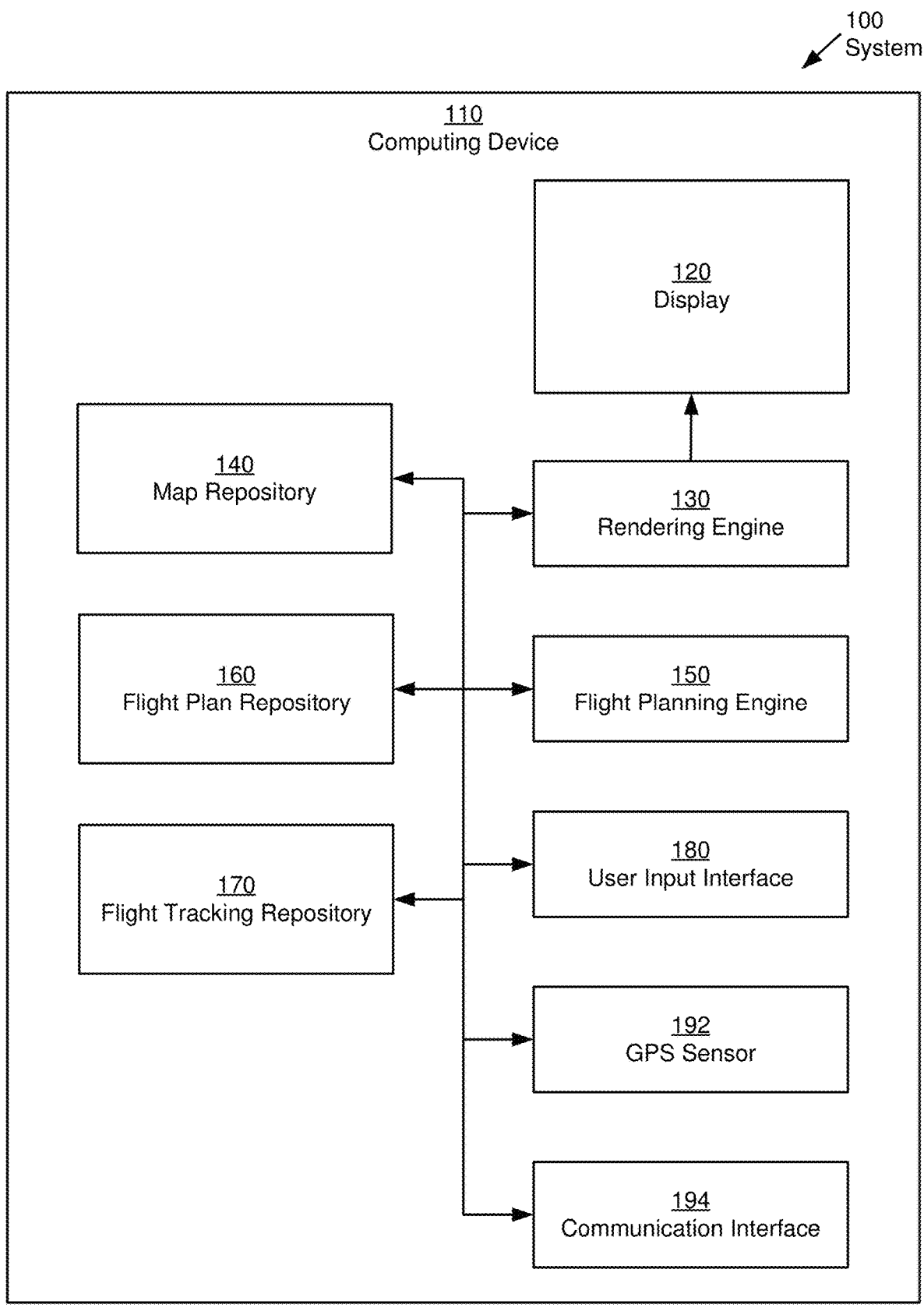
FIG. 1 shows a block diagram of a system for position reporting and navigation in an integrated flight application, in accordance with one or more embodiments of the invention.

Specific embodiments of the disclosed technology will now be described in detail with reference to the accompanying figures. Like elements in the various figures may be denoted by like reference numerals and/or like names for consistency.

The following detailed description is merely exemplary in nature, and is not intended to limit the disclosed technology or the application and uses of the disclosed technology. Furthermore, there is no intention to be bound by any expressed or implied theory presented in the preceding technical field, background, brief summary or the following detailed description.

In the following detailed description of embodiments of the disclosed technology, numerous specific details are set forth in order to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Various embodiments of the invention enable position reporting and navigation in integrated flight applications using a bullseye. In certain scenarios, it may be desired to exchange location information within a team, while preventing third parties from deciphering the location information. A bullseye may be used for this purpose, as subsequently described. The bullseye, in accordance with one or more embodiments of the invention, is a geographic reference point in geographic space whose location is only known to team members. Any geographic location may be used as the bullseye. If positions are communicated relative to the bullseye, only team members, but not third parties, may be able to determine the actual positions that are being communicated, as long as the bullseye location remains confidential.

In one or more embodiments of the invention, the bullseye is presented and used in an integrated flight application. An integrated flight application may include various components that may serve an aircraft crew, e.g., pilots, co-pilots, etc. These components may include, for example, various types of maps (visual flight rules (VFR) sectionals, VFR and instrument flight rules (IFR) en-route charts, airport diagrams, terminal area charts, world aeronautical charts, surface maps showing terrain features, streets, weather charts, etc.). The maps may be set up as layers and/or overlays that give the flight crew the flexibility to review the most relevant or desired features, while hiding currently non-relevant features in a situation-specific manner. For example, based on an initial zoom level used to show a larger geographic area, only an airport symbol may be shown, and upon zooming in, airport diagrams, complete with runways, taxi labels, and fixed-based operator (FBO) locations may appear.

The integrated flight application may be used to gather and view information during a flight, but also to plan flights and/or to select routes based on flight plans. The selected routes may then be displayed on maps. Maps provided by the integrated flight application may be moving maps for air and/or ground operations that include an own-ship display indicting the current position of the aircraft on the moving map as the flight is progressing.

Integrated flight applications may be used by private, commercial and/or military pilots. The integrated flight applications may be particularly beneficial in reducing the crew's workload and/or improve in-flight situational awareness.

Integrated flight applications may be used by team members performing a mission that requires the exchange of location information. Assuming a scenario in which it is undesirable to share location information in a format that enables third parties to decipher this location information, the location information may be communicated relative to the bullseye. While using a bullseye effectively prevents third parties to interpret the location information, additional steps are performed to enable team members to make use of the communicated location information in an efficient manner. The steps may be performed by embodiments of the invention as subsequently described with reference to figures that show systems and flowcharts.

Turning to FIG. 1, a block diagram of a system for position reporting and navigation in an integrated flight application (100), in accordance with one or more embodiments of the invention, is shown. The system (100) is based on a computing device (110) and may include a display (120), a rendering engine (130), a map repository (140), a flight planning engine (150), a flight plan repository (160), a flight tracking repository (170), a user input interface (180), a global positioning system (GPS) sensor (192), and a communication interface (194). Each of these components is subsequently described.

The computing device (110) may be a portable computing device, for example, a tablet computer, a smartphone, or a laptop. Exemplary configurations of computing devices in accordance with one or more embodiments of the invention are described below, with reference to FIGS. 6A and 6B. Alternatively, a permanently installed computing device may be used instead of the portable computing device, without departing from the invention. For example, in one or more embodiments of the invention, the computing device may be installed in a cockpit of an airplane or in a dashboard of a vehicle. The computing device (110), in accordance with one or more embodiments of the invention, is configured to execute a set of machine-readable instructions (stored on a computer-readable medium) which, when executed by the computing device (110), perform one or more of the operations described in the flowcharts of FIGS. 3 and 4. The computing device (110) further enables user interaction via the display (120) and via the user input interface (180) and supports communication with other computing devices via the communication interface (194) as discussed below.

The display (120) of the computing device (120) may be a screen, such as a liquid crystal display (LCD), light emitting diode (LED) or organic LED (OLED) screen or any other type of display that supports visual content to be shown to a user. Specialized display technologies or accessories may further be used, e.g., screens that are customized for nighttime use. The display may be used as the output interface to a user (e.g. a pilot) and may display various layers of maps, additional symbolic or text content, etc.

The rendering engine (130) may be hardware and/or software configured to generate the visual content to be displayed to the user on the display (120). The rendering engine (130) may accept input (i.e., content) from the map repository (140) (e.g., a map segment to be displayed, overlays with additional information, etc.), input from the flight plan repository (160) (e.g., legs of a flight plan to be superimposed on a selected map segment), and/or any other input that is to be displayed to the user (e.g., current location information, object indicators, etc.). In one or more embodiments of the invention, the rendering engine is configured to render maps and other content that may include multiple layers in a format that facilitates the viewing of this content by the user. For example, the rendering engine may perform font and symbol scaling in a zoom-level dependent manner, may adjust the transparency of overlays to ensure readability and/or may consider daytime and nighttime conditions. The rendering by the rendering engine (130) may further be controlled by input provided by the user. Specifically, a user may select a particular map segment, zoom into or out of a map, may activate or deactivate overlays to show additional details, etc. In one or more embodiments of the invention, the rendering engine (130) is capable of operating in different reference frames and to convert between these reference frames, as further discussed below The map repository (140) may store one or more raster images and/or vector images of maps to be displayed to the user. The map repository (120) may be structured in any form suitable for storing raster and/or vector images. The map repository may be located on a hard disk drive, on a flash drive or on any other non-volatile storage medium. Alternatively, parts of the map repository or the entire map repository may be stored in volatile memory.

The flight planning engine (150) may include software instructions that enable a user to compose, edit and view a flight plan. In particular, the flight planning engine may be configured to superimpose a flight path from a departure point to an arrival point, possibly via waypoints, on a map to be displayed to the user. The departure, arrival and/or waypoints may be selected on a map, as further discussed below.

The flight plan repository (160) may store flight plans generated and/or used by the flight planning engine (150). The stored elements of a flight plan may include departure point, arrival point and waypoints. A flight plan stored in the flight plan repository may also include elements in addition to those that are displayed on a map. For example, the flight plan may include radio frequencies to be used, available navigational aids, en-route times, arrival times, departure times, etc.

The flight tracking repository (170) may store the recordings of executed flights. Locations that were obtained during the flight using the GPS sensor (192) may be stored. Further, information that was entered by a user may also be stored.

For example, if a user enters coordinates of objects, bullseyes, etc., this information may be stored in the flight tracking repository as well. The stored recordings may be analyzed at a later time, e.g., in a flight debriefing.

The user input interface (180) may enable a user to control the system for position reporting and navigation in an integrated flight application. The user input interface, in accordance with one or more embodiments includes a keyboard. The keyboard may be a touch pad, e.g., implemented as a touch screen keyboard that may be superimposed on the display (120). Alternatively or additionally, other user input interfaces such as speech recognitions may be provided.

The GPS sensor (192) may provide location information to the computing device. The location information may be used to update the current location on the displayed map, as further discussed below. The location information may further be stored in the flight tracking repository. The GPS sensor may be a sensor built into the computing device (110) or may be an external sensor that may be installed on the aircraft being used.

The communication interface (194) may be a WiFi or Bluetooth interface or any other communication interface enabling the communication between the computing device and another computing device. The communication interface may be used to exchange data such as location data between the computing devices.

While FIG. 1 shows a configuration of components, other configurations may be used without departing from the scope of the invention. For example, various components may be combined to create a single component. As another example, the functionality performed by a single component may be performed by two or more components. Accordingly, for at least the above-recited reasons, embodiments of the disclosed invention should not be considered limited to the specific arrangements of components and/or elements shown in FIG. 1.

Figure 2:
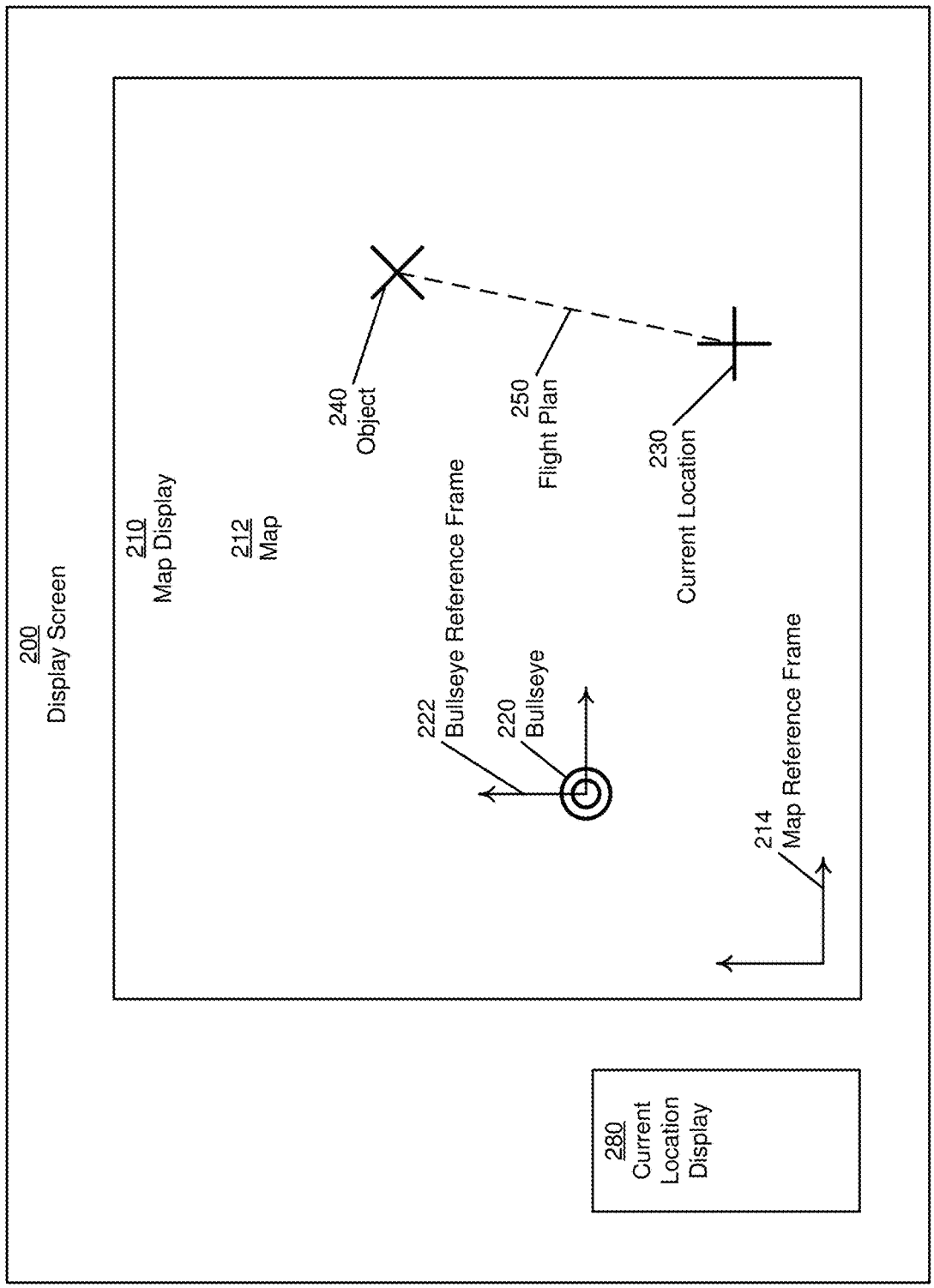
FIG. 2 shows a display screen of a system for position reporting and navigation in an integrated flight application, in accordance with one or more embodiments of the invention.

Turning to FIG. 2, a display screen (200) in accordance with one or more embodiments of the invention is shown. The display screen (200) may be displayed in the display (120). The display screen (200) may include a map display (210) and a current location display (280). The map display (210) and the current location display (280) are subsequently discussed.

The map display (210) may include a map (212). The map (212) may be any map obtained from the map repository (140). The map may be displayed with various layers of additional information superimposed. For example, the map may be a sectional chart with weather information superimposed. The map may be shown at any zoom level and may be customized based on user preferences. For example, a user-selected color coding or brightness level may be used. The map (212), in accordance with one or more embodiments of the invention, is associated with a map reference frame (214). The map reference frame (214) may be any map reference frame. A map reference frame is a coordinate system of a map. For example, the map reference frame may be a coordinate system that is commonly used in aviation maps, e.g., based on latitude/longitude. Any coordinate system may be used as the map reference frame (214), without departing from the invention.

The map display (210) may further include a bullseye (220). The bullseye may be superimposed on the map (212). The bullseye location in the map (212) may be established using the map reference frame (214). A bullseye symbol may be displayed in the map display (210) to indicate the location of the bullseye (220). In one or more embodiments of the invention, the bullseye (220) is associated with a bullseye reference frame (222). The bullseye reference frame (222) may be centered at the location of the bullseye (220). The bullseye reference frame may be any kind of reference frame. In one embodiment of the invention, the bullseye reference frame (222) is based on polar coordinates. Accordingly, in the bullseye reference frame, a location would be described using a bearing (in a range from 0° to 360°) and a distance (e.g. in nautical miles or alternatively in statute miles or kilometers). The bearing may be based on a magnetic or on a true north.

The current location (230), in accordance with one or more embodiments of the invention, indicates the own-ship location on the map (212). The own-ship location may indicate a position and may further indicate an orientation (heading) on the map. The own-ship location may be expressed relative to the bullseye (220) using the bullseye reference frame (222) or relative to the coordinate system of the map (212) using the map reference frame (214). In one or more embodiments of the invention, the own-ship location may be described related to the bullseye (220) when team members communicate, thereby preventing third parties from deciphering the own-ship location.

The object (240), in accordance with one or more embodiments of the invention, indicates the location of an object on the map (212). An object may be anything of interest to a flight crew. For example, an object may be another aircraft (e.g., an aircraft piloted by another team member or by an enemy), a landmark, a target to be investigated or to be attacked, etc. The object location may be expressed relative to the bullseye (220) using the bullseye reference frame (222) or relative to the coordinate system of the map (212) using the map reference frame (214). In one or more embodiments of the invention, the object location may be described related to the bullseye (220) when team members communicate, thereby preventing third parties from deciphering the object location.

The current location display (280), in accordance with one or more embodiments of the invention, provides a readout of the current own-ship location to the user. In one or more embodiments of the invention, the current location is provided relative to the bullseye (220), enabling the user to communicate, e.g., via radio, the current location to team members without disclosing the current location to third parties. The current location display may alternatively or additionally display the own-ship location using the map reference frame. Readouts for other locations may further be displayed. For example, the location of an object may be displayed using either the bullseye reference frame or the map reference frame.

Those skilled in the art will recognize that other elements may be displayed on the display screen (200) without departing from the invention. For example, multiple objects (240) may be simultaneously displayed, and/or any other content that is obtained from the map repository (140), the flight plan repository (160) and/or the flight tracking repository (170) may be shown. Further, while embodiments of the invention are described in context of aviation, those skilled in the art will appreciate that embodiments of the invention are equally applicable in other scenarios, in which locations are to be communicated among team members without disclosing these locations to third parties. Accordingly, systems such as the system (100) are not limited to the use in aircraft but may also be installed in vehicles such as police cars, tanks and/or in watercraft, etc.

Figure 3:
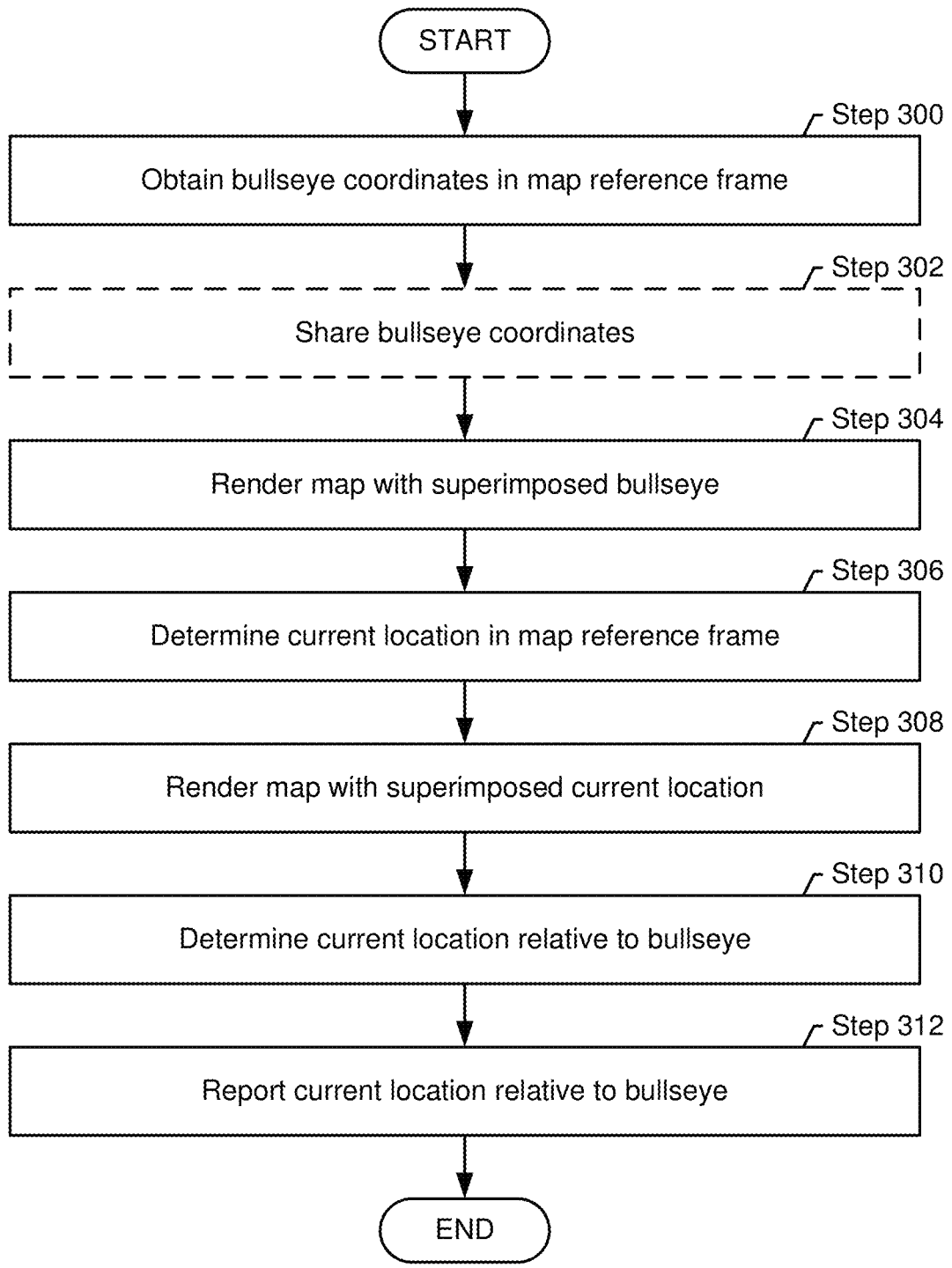
FIGS. 3 and 4 show flowcharts describing a method for using a bullseye for position reporting and navigation, in accordance with one or more embodiments of the invention.
Figure 4:
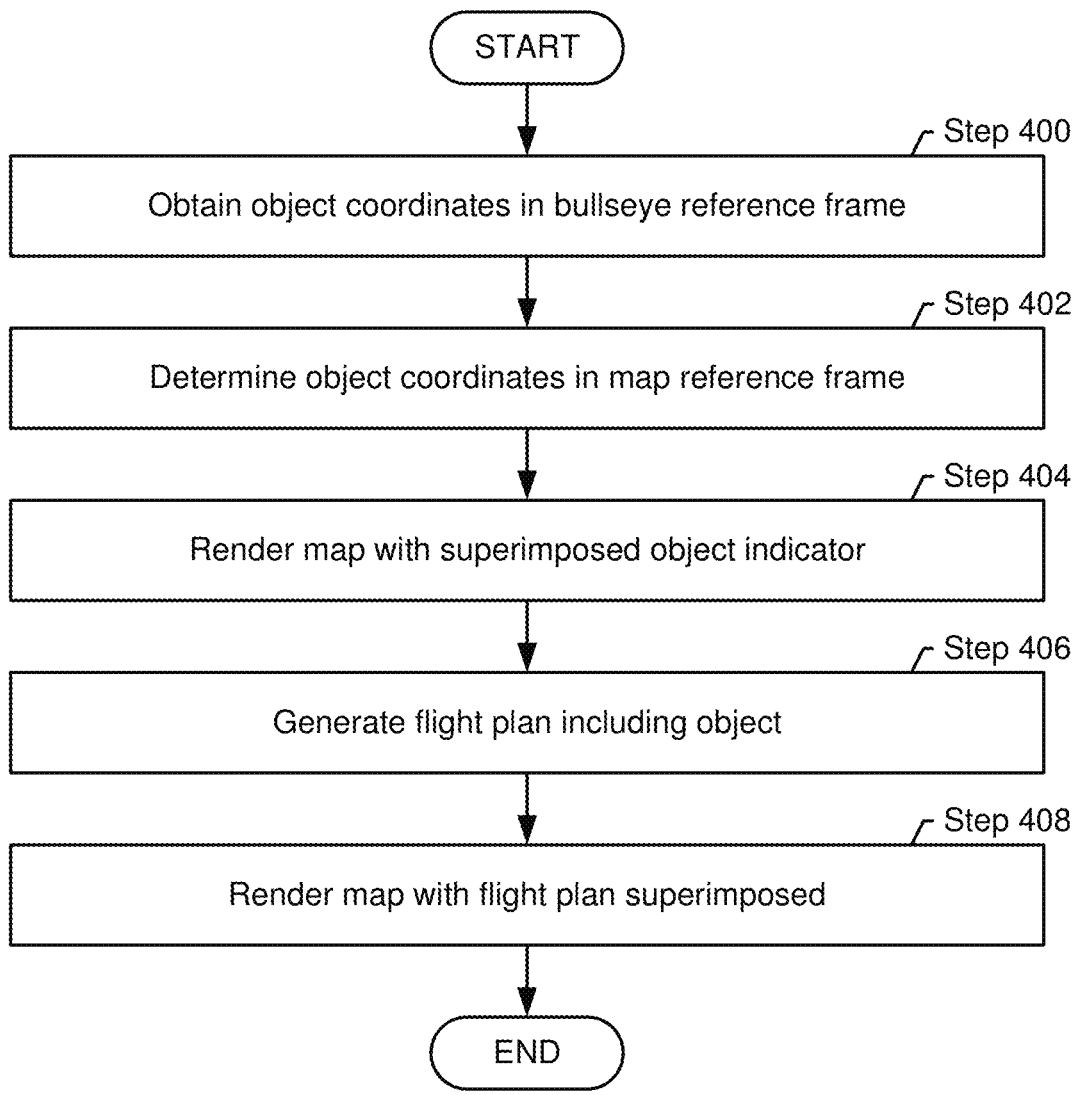

FIGS. 3 and 4 show flowcharts in accordance with one or more embodiments of the invention. While the various steps in these flowcharts are presented and described sequentially, one of ordinary skill will appreciate that some or all of these steps may be executed in different orders, may be combined or omitted, and some or all of the steps may be executed in parallel. In one embodiment of the invention, the steps shown in FIGS. 3 and 4 may be performed in parallel with any other steps shown in FIGS. 3 and 4, without departing from the invention.

FIG. 3 describes a method for obtaining a bullseye location and for reporting a current location relative to the bullseye. Various steps of the method may be executed upon availability of bullseye coordinates. Other steps of the method may be executed subsequently to report the current location relative to the bullseye. These steps may be repeatedly executed to update the reporting of the current location as the current location changes.

In Step 300, bullseye coordinates are obtained. In one or more embodiments of the invention, the bullseye coordinates are provided in the map reference frame. The bullseye coordinates may be obtained by receiving keyboard input from a user. Alternatively, the coordinates may be received as speech input. Further, the coordinates may be obtained by tapping on the map, thereby identifying a particular location on the map as the bullseye location. Step 300 may occur once a user learns about the bullseye. Consider, for example, the following scenario: A team of pilots is preparing for a mission that involves location sharing using the bullseye. During the pre-flight mission briefing the bullseye coordinates are shared among the pilots. The pilots then enter the shared bullseye coordinates, thereby initiating the execution of Step 300. The bullseye coordinates may be obtained in various format. For example, they may be obtained in a degrees, minutes, seconds format such as: 41°24'12.2"N 2°10'26.5"E; in a degrees, decimal minutes format such as: 41 24.2028, 2 10.4418; or in a decimal degrees format such as: 41.40338, 2.17403. By way of another example, the coordinates may be Military Grid Reference System (MGRS) coordinates. The pilot may enter these coordinates for example by typing them. Alternatively, a landmark such as "Golden Gate Bridge" may be provided. The pilot may either select the Golden Gate Bridge by tapping on the bridge on the map, or by typing the location "Golden Gate Bridge.

In Step 302, once the bullseye coordinates are obtained, they may be shared. Assume, for example, that both a pilot and a copilot use a system as described in FIG. 1. The copilot may handle the communications and may thus enter the bullseye coordinates. Because the systems of the pilot and the copilot are connected via communication interfaces as previously described, the bullseye location may also become available on the pilot's system. If the bullseye position is a saved user-entered waypoint, the waypoint can be shared via email or computer/tablet file sharing services to the copilot, who may then search for the entity using the search feature and designate it as the bullseye to achieve the same frame of reference as the pilot. Other data, e.g., object locations, flight plans, etc. may be shared as well, thus enabling an effective workload management between pilot and copilot.

In Step 304, the map is rendered with the superimposed bullseye symbol appearing at the location that was provided in Step 300. The rendering output may be displayed to the user in the display.

In Step 306, the current location (i.e., the own-ship location) is determined. The current location may be obtained using the GPS sensor signal. In one or more embodiments of the invention, the GPS sensor signal is obtained in a format that is compatible with the map reference frame, thus enabling updating of the map based on the current location.

In Step 308, the map is rendered with the superimposed current location. The current location may be indicated using an own-ship symbol and/or by re-centering the map based on the current location. The rendering output may be displayed to the user in the display.

In Step 310, the current location is obtained relative to the bullseye, i.e., in the bullseye reference frame. While the current location (e.g., obtained from the GPS sensor signal) may initially be in the map reference frame (e.g., using latitude/longitude coordinates as previously discussed), a transformation may be applied to make the current location available in the bullseye reference frame, based on the known bullseye location in the map reference frame. Specifically, the current location is given as a readout of range and magnetic bearing from the bullseye. Thus, the transformation is performed from a fixed coordinate (i.e., map reference frame) into a vector coordinate (e.g., a direction and distance, such as in nautical miles) from the bullseye location. In one or more embodiments, to perform the transformation, the bullseye location and the current location are set against a WGS84-based spherical earth model, based on the Mercator projection with custom corrections and orthorectification. Triangulation may be performed to identify the distance and angular direction from the bullseye. After the conversion, the current location may be available in the bullseye reference frame, e.g., describing the current location using a bearing and a distance.

In Step 312, the current location is reported relative to the bullseye. The current location may be reported in a current location display of the display screen. Pilots may directly read and communicate the current location in the bullseye reference frame to other team members, thereby avoiding disclosing the current location to third parties.

Turning to FIG. 4, a method for obtaining object coordinates in the bullseye reference frame and for using the object in aviation tasks is shown. The method may be executed once an object becomes available.

In Step 400, object coordinates are obtained in the bullseye reference frame. For example, the object coordinates may be entered, e.g., by a flight crew member, upon receipt via radio communication from another team member. In particular, the objects coordinates may be a vector in the bullseye reference frame.

In Step 402, the object coordinates are determined in the map reference frame. A transformation is applied to convert the object coordinates from the bullseye reference frame to the map reference frame. Both the bullseye location and the object location are set against a WGS84-based spherical earth model, based on the Mercator projection with custom corrections and orthorectification. The flight planning engine, having the map-reference coordinate location of both the current location and the object, can provide me navigation between the two. After the conversion, the object location may be available in the map reference frame, e.g., describing the current location using a latitude/longitude format.

In Step 404, the map is rendered with the superimposed object. The object location may be indicated by an object indicator on the map. The rendering output may be displayed to the user in the display.

In Step 406, a flight plan that includes the object is generated. Once the object is available in the map reference frame, it may be integrated into an existing flight plan. The object may, thus, serve as a new waypoint or as a destination.

Alternatively, a new flight plan including the object may be generated. The flight plan may subsequently be stored in the flight plan repository.

In Step 408, the map is rendered with the superimposed flight plan. The flight plan may be shown in the map by indicating one or more legs of the flight plan. The rendering output may be displayed to the user in the display.

Figure 5A:
FIG. 5A, FIG. 5B, FIG. 5C, FIG. 5D, FIG. 5E, FIG. 5F, FIG. 5G, and FIG. 5H show an example in accordance with one or more embodiments.

FIG. 5A, FIG. 5B, FIG. 5C, FIG. 5D, FIG. 5E, FIG. 5F, FIG. 5G, and FIG. 5H show an example in accordance with one or more embodiments. FIG. 5A shows a user interface (500) having a map. The map reference frame is the coordinate system of the map. An arbitrary point is selected on the map by tapping on a displayed map element (i.e., a location on the map) to reveal a window (502) with menu buttons (504). The map elements can be visually selected or typed in by name or by coordinate. A user may select button (506) to create a bullseye location. In the example user interface, the current location is marked with an airplane (508).

Figure 5B:
Figure 5C:
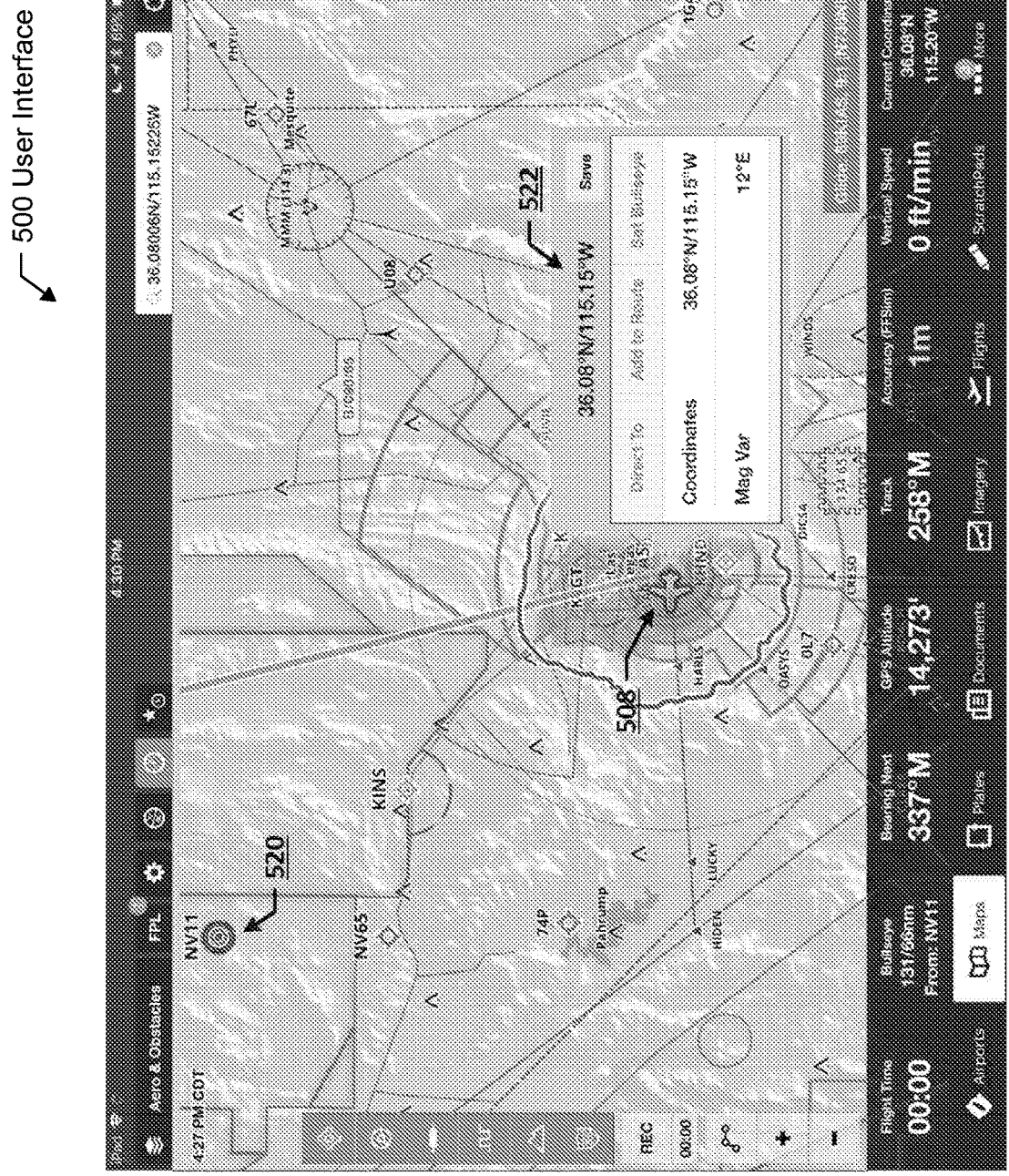

Continuing with the example, in FIG. 5B, the user selects NV11 (510) as the bullseye point. In response, window (512) may be displayed to show information about the bullseye location. The bullseye location (520) may then be marked using concentric circles in the user interface (500) for the user as shown in FIG. 5C. Further, as shown in FIG. 5C, a window is displayed that shows the bullseye instrument (522). The bullseye instrument (522) updates with the GPS position of the aircraft (508) to reflect the magnetic bearing, labeled "Mag Var" in FIG. 5C, and range, labeled "Coordinates" in FIG. 5C, in nautical miles from the bullseye location. The arbitrary point may be given as a set of coordinates. Coordinates may be typed in as latitude and longitude or as military grid reference system (MGRS) coordinates and rapidly set as the point.

Figure 5D:
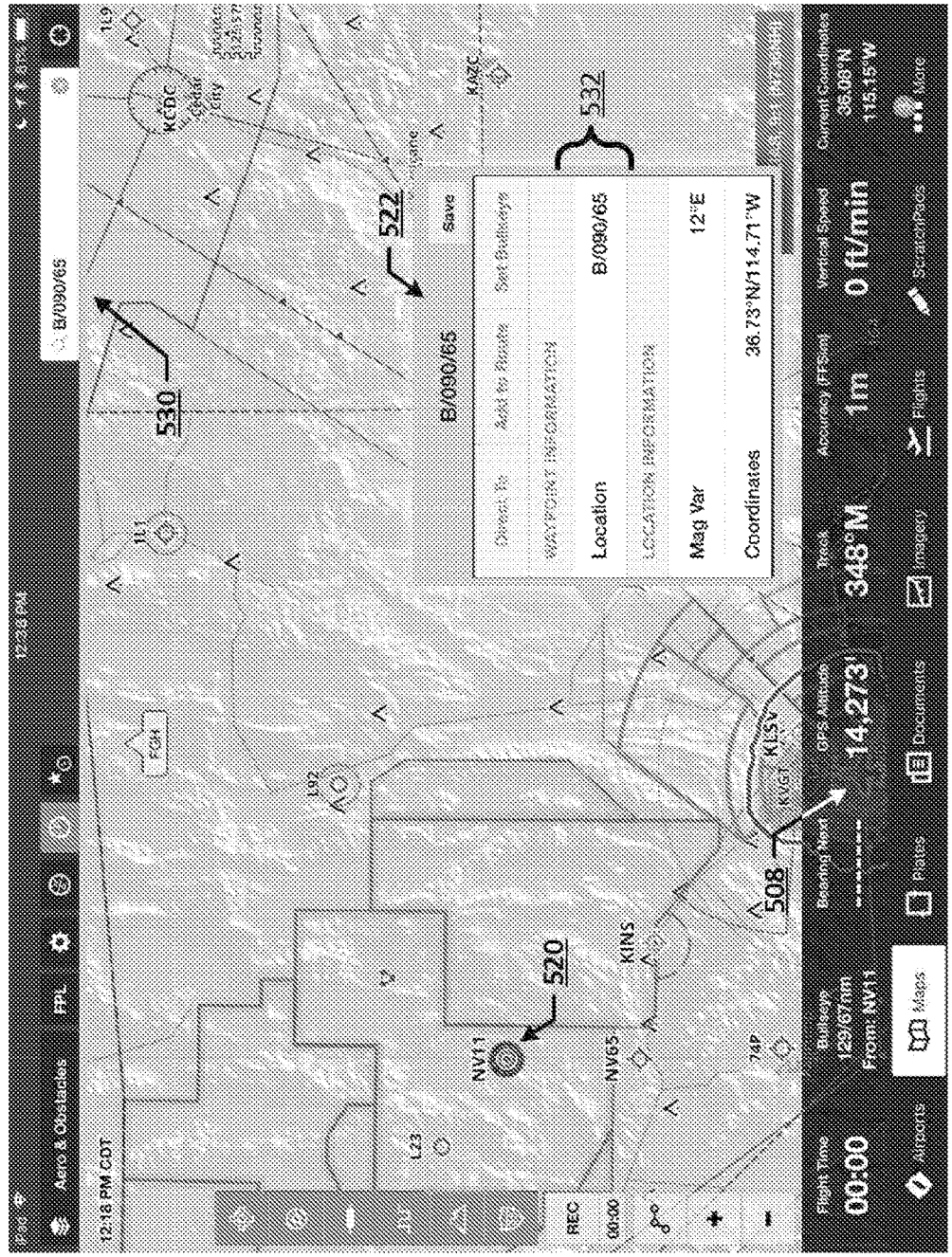

Turning to FIG. 5D and continuing with the example, position coordinates of an object said verbally to the user over the radio may be quickly typed into the search bar (530) to show that position on the map, following the format in which the position coordinates are commonly spoken. As shown in the search bar, the position coordinates are defined with respect to the bullseye (i.e., in the bullseye reference frame). The bullseye instrument (522) may be updated to include the object location as shown by added information (532). In the present example, the object location is a waypoint.

Figure 5E:
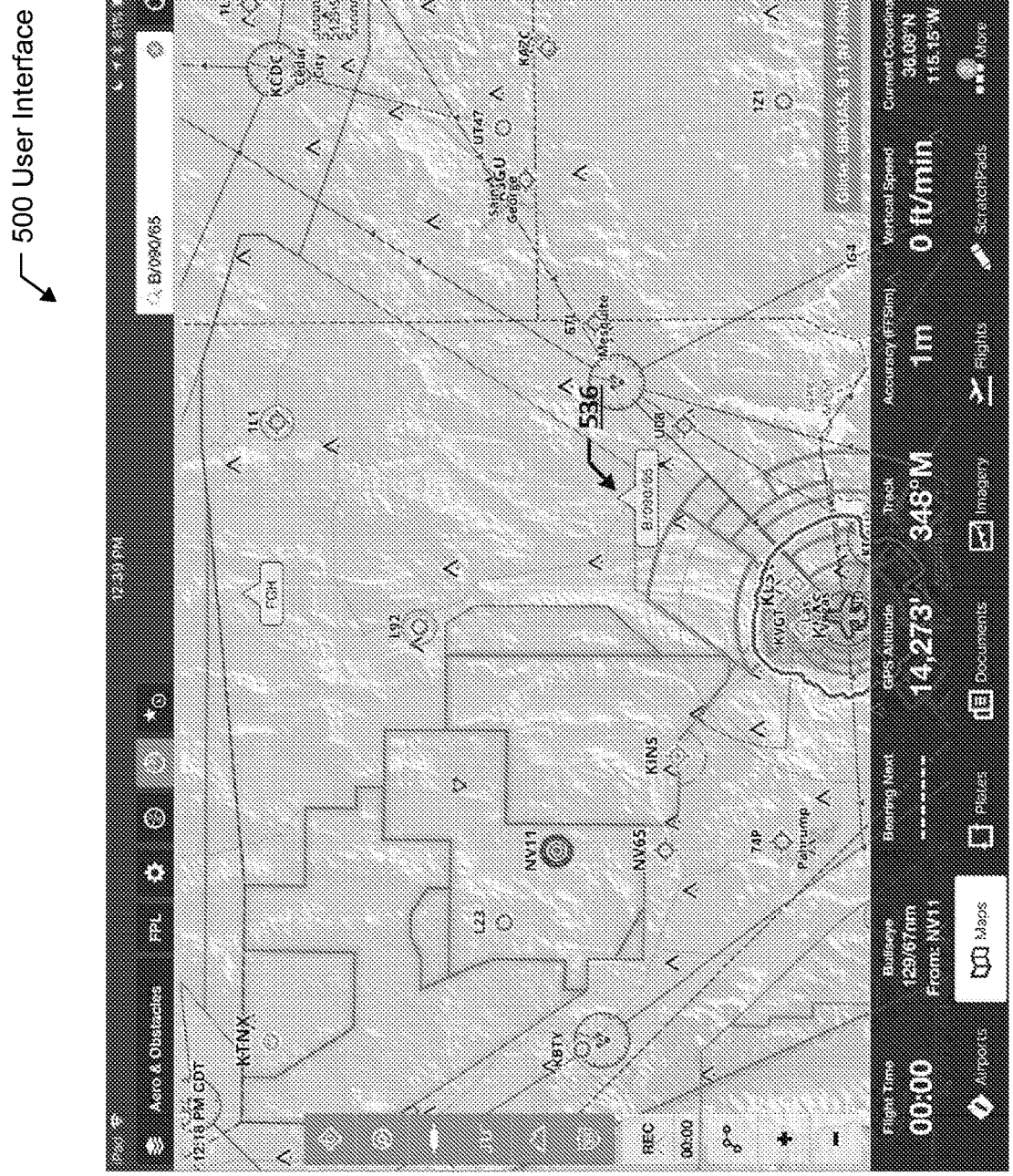
Figure 5F:
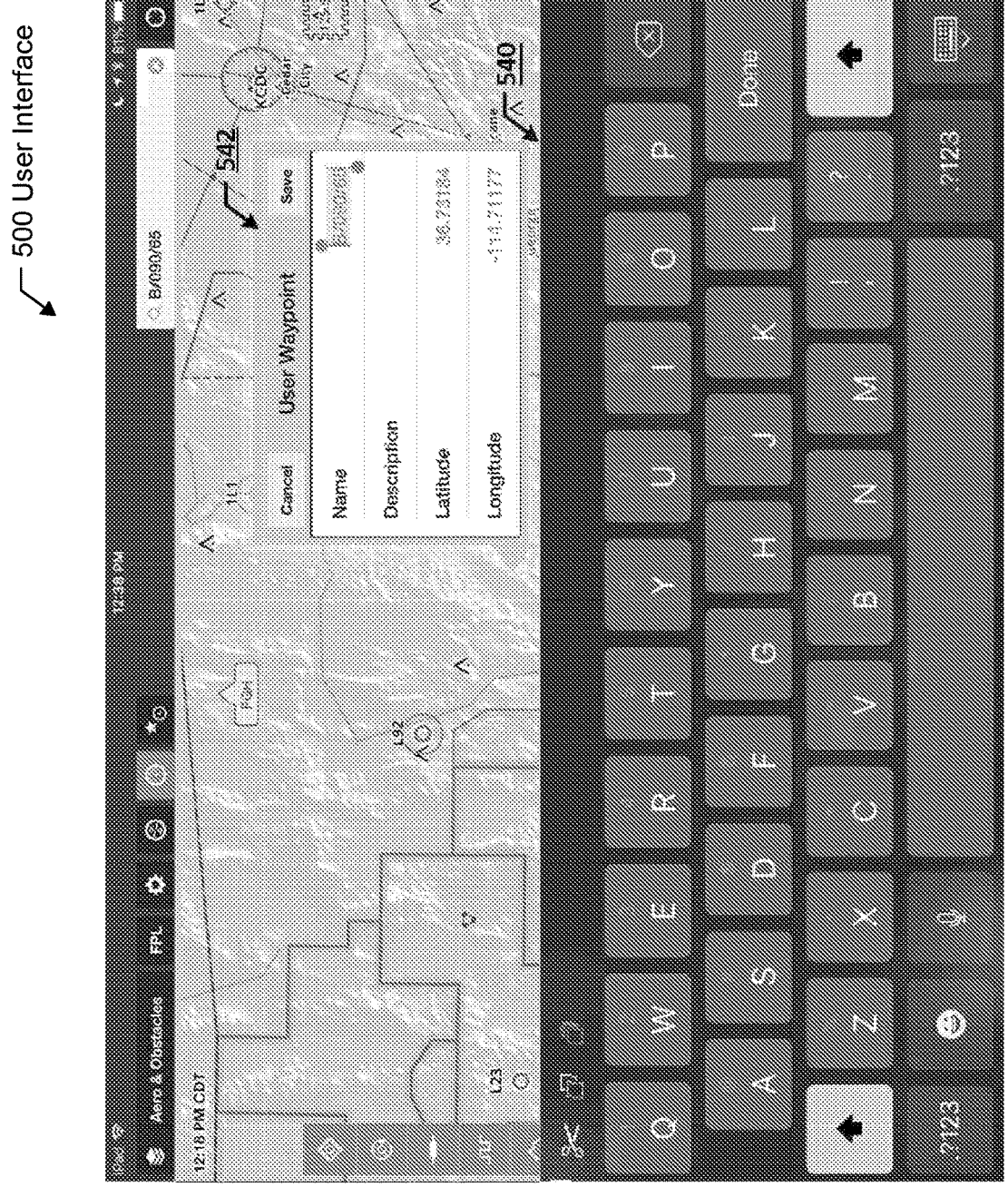

As shown in FIG. 5E, the object location (536) is displayed with a reference to the location. In other words, the position coordinates in the bullseye reference frame are translated to the map reference frame. The position report can be saved for reference later in the flight or the mission with an additional tap, and the name can be changed. Conversion to the coordinate selection of the user's choice is automatic. For example, as shown in FIG. 5F, a virtual keyboard (540) and window (542) may be displayed to submit information about the object location. Notably, the object location is secret except with reference to the bullseye. In other words, the user interface does not publish the object location.

Figure 5G:
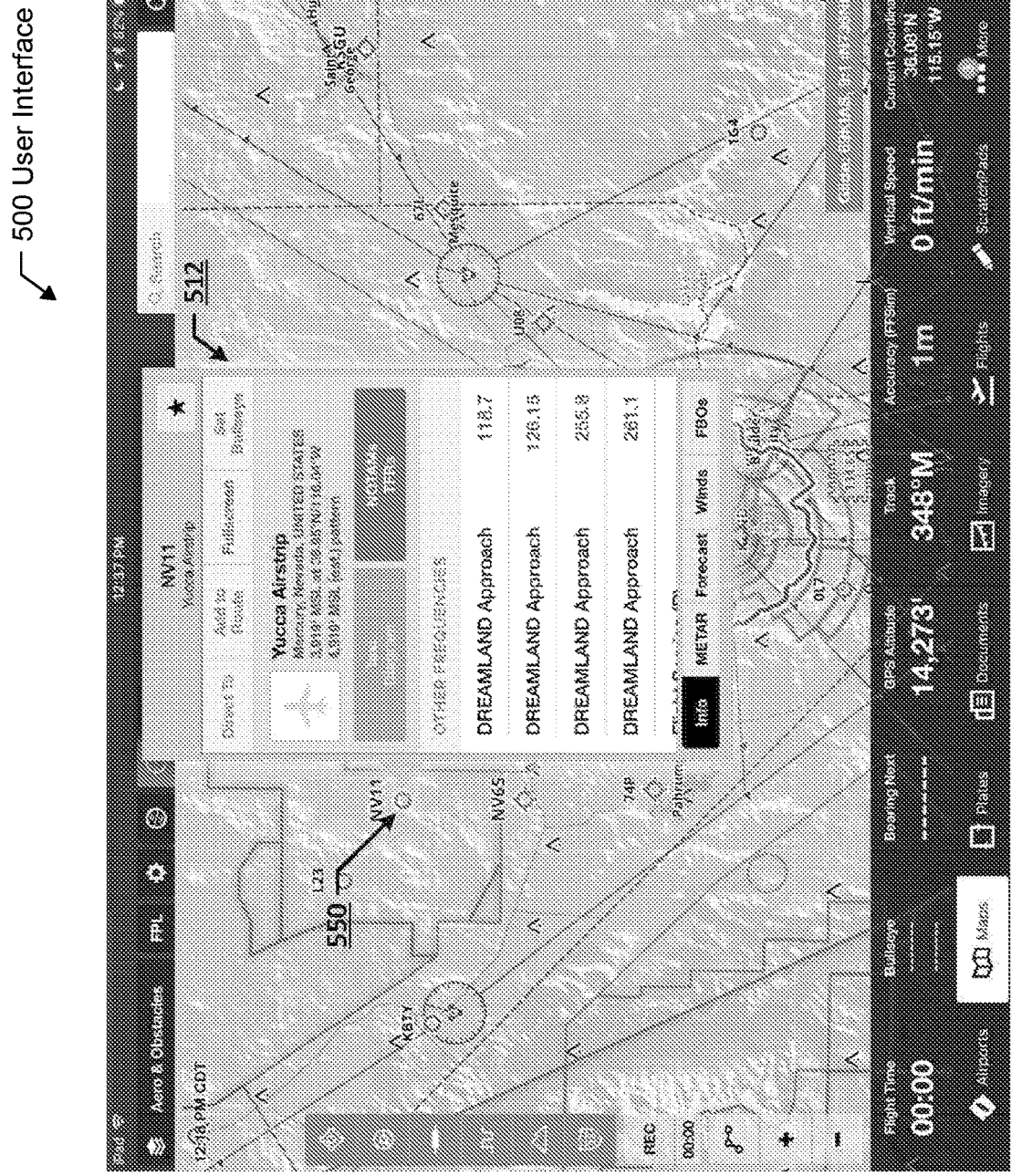

Continuing with the example and in FIG. 5G, the user may select to clear the bullseye by selecting a single button. In response, the bullseye is cleared as shown by lack of the concentric circles around NV11 (550).

Figure 5H:
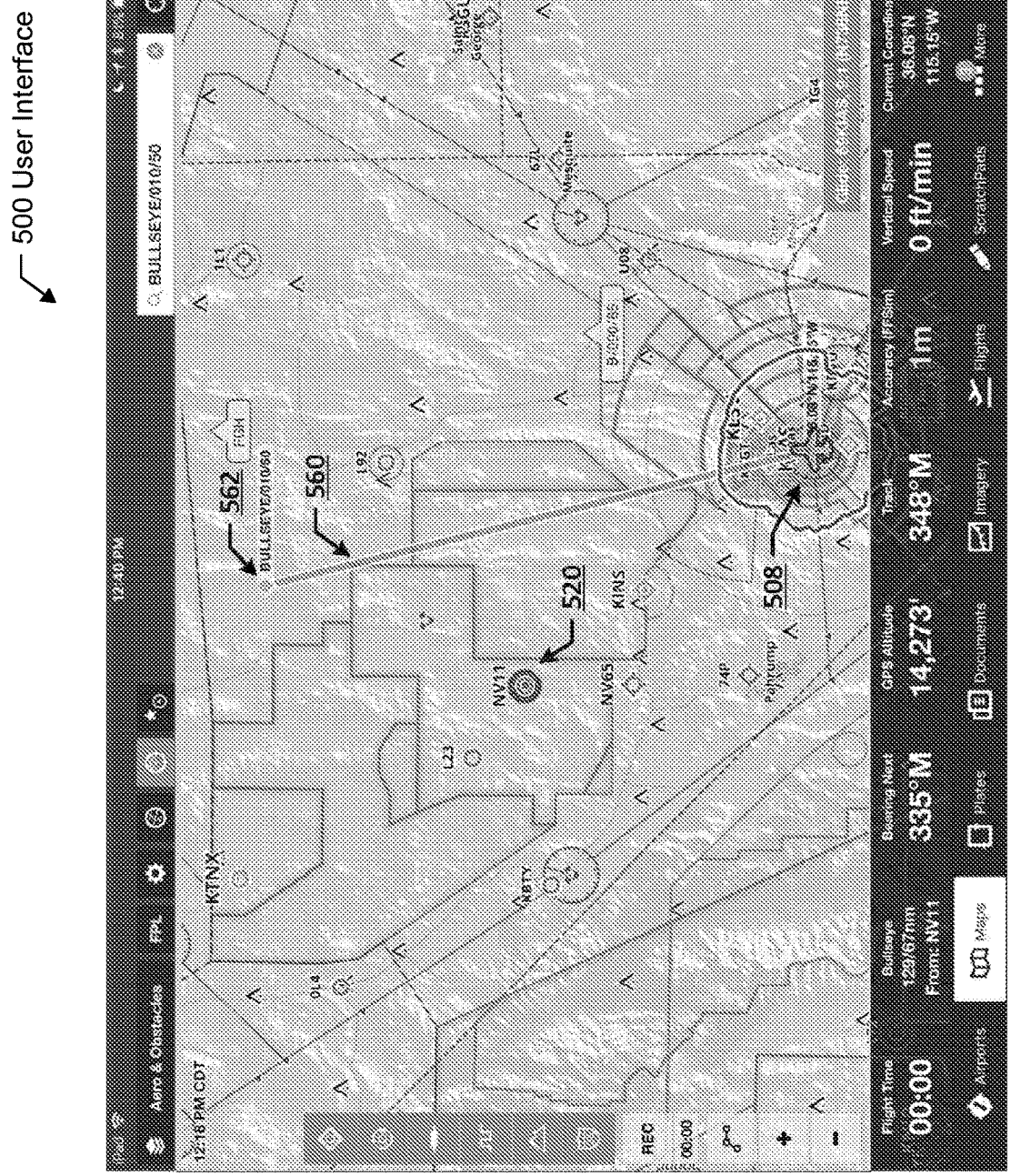

Continuing with the example from FIG. 5F, as shown in FIG. 5H, using the "direct to" and "add to route" button options, a passed position report can rapidly be added to the user's route to navigate the aircraft to that location. In such a scenario, a route (560) is displayed. In the example, the route is to an object location (562) from the current location (508), where the object location is defined with respect to bullseye location (520).

As shown in the example, the bullseye location is determine by decision by user(s) and entered through typing precise coordinates or by visually selecting a feature on the map through the device's hardware/software user interface. For example, the user may submit a latitude and longitude. The user interface displays a marker of that precise position and a button to set this position as the bullseye. The user may also look at the map, tap on the position in the map, and receive the same marker with the same option to set this position as the bullseye.

Selecting the option for the bullseye will place a bullseye symbol on that point which I can view for reference. Over the radio, a person using the bullseye will call out a feature of interest as a vector from the bullseye as in "enemy fighters Bullseye 230 for 30" indicating that enemy fighters are located 30 nautical miles from the bullseye at a magnetic heading of 230°.

Hearing this, the user can type "BULLSEYE/230/30" into the user's application and immediately see a marker that corresponds to 30 nautical miles from the bullseye at a magnetic heading of 230°. This essentially turns the vector into an absolute location. Knowing this location, my flight planning engine can now provide navigation to this point or let the user plan to avoid this point. With a Bullseye set and the Bullseye instrument active, a static or moving GPS position of the user's current location will be converted into a numeric readout on the instrument of a vector (direction and distance) from the bullseye point. The coordinates will update constantly as the user's current location move about and the GPS position changes.

The leg to the object is a function of the flight planning engine. Once the location of the object is converted from relative vector to absolute position, the user may choose to make the flight planning engine depict any legs that the user wishes to plan to the object just as it does for the rest of the route.

Various embodiments of the invention may have one or more of the following advantages. Embodiments of the invention enable a user to quickly and easily determine the own-ship location relative to an arbitrary point (the bullseye), and any other location relative to the arbitrary point. Location sharing within a team may thus be performed without disclosing locations to third parties. One or more embodiments of the invention allow the integration of the use of arbitrary points for navigation and location sharing with other flight applications. According, these features may be used in combination with the other flight applications including map features such as weather, terrain, obstacles, airports, etc., and other functions for saving and analyzing upcoming, ongoing or completed flights.

Figure 6A:
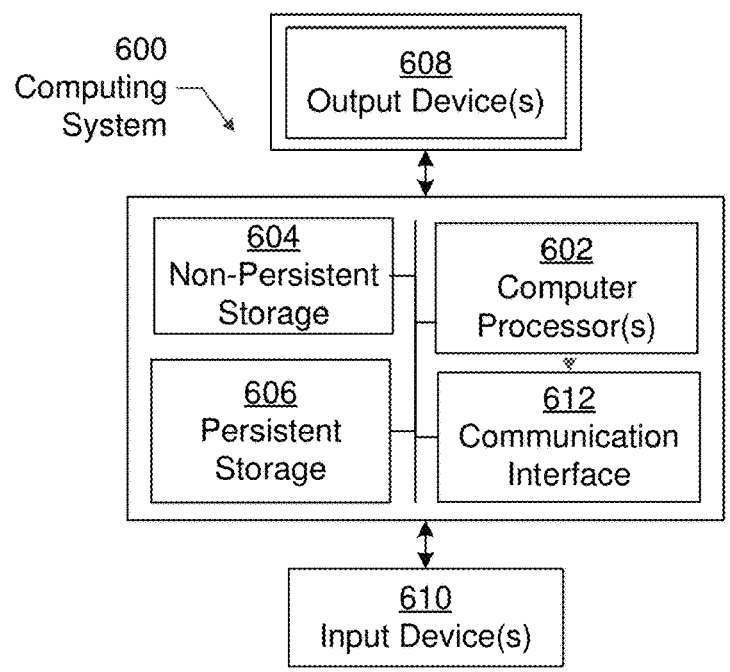
FIGS. 6A and 6B show computing systems in accordance with one or more embodiments of the invention.

Embodiments of the invention may be implemented on a computing system. Any combination of mobile, desktop, server, router, switch, embedded device, or other types of hardware may be used. For example, as shown in FIG. 6A, the computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), and numerous other elements and functionalities.

The computer processor(s) (602) may be an integrated circuit for processing instructions. For example, the computer processor(s) may be one or more cores or micro-cores of a processor. The computing system (600) may also include one or more input devices (610), such as a touchscreen, keyboard, mouse, microphone, touchpad, electronic pen, or any other type of input device.

The communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

Further, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 6B:
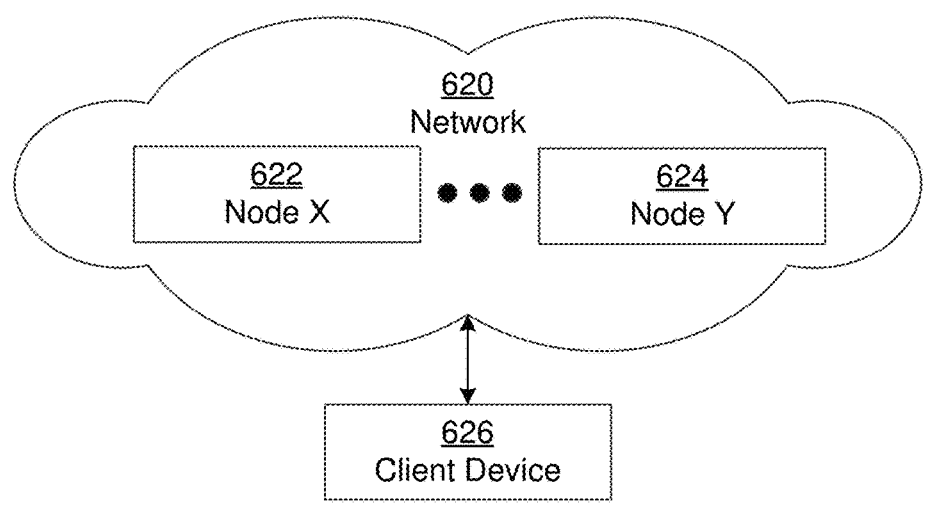

The computing system (600) in FIG. 6A may be connected to or be a part of a network. For example, as shown in FIG. 6B, the network (620) may include multiple nodes (e.g., node X (622), node Y (624)). Each node may correspond to a computing system, such as the computing system shown in FIG. 6A, or a group of nodes combined may correspond to the computing system shown in FIG. 6A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (600) may be located at a remote location and connected to the other elements over a network.

Although not shown in FIG. 6B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (622), node Y (624)) in the network (620) may be configured to provide services for a client device (626). For example, the nodes may be part of a cloud computing system. The nodes may include functionality to receive requests from the client device (626) and transmit responses to the client device (626). The client device (626) may be a computing system, such as the computing system shown in FIG. 6A. Further, the client device (626) may include and/or perform all or a portion of one or more embodiments of the invention.

The computing system or group of computing systems described in FIGS. 6A and 6B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 6A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query provided to a structured data repository (where the data repository may be organized according to a database schema or data format, such as XML).

The extracted data may be used for further processing by the computing system. For example, the computing system of FIG. 6A, while performing one or more embodiments of the invention, may perform data comparison. Data comparison may be used to compare two or more data values (e.g., A, B). For example, one or more embodiments may determine whether $A>B$, $A=B$, $A!=B$, $A<B$, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if $A>B$, B may be subtracted from A (i.e., $A-B$), and the status flags may be read to determine if the result is positive (i.e., if $A>B$, then $A-B>0$). In one or more embodiments, B may be considered a threshold, and A is deemed to satisfy the threshold if $A=B$ or if $A>B$, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 6A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 6A may include functionality to provide raw and/or processed data, such as results of comparisons and other processing. For example, providing data may be accomplished through various presenting methods. Specifically, data may be provided through a user interface provided by a computing device. The user interface may include a GUI that displays information on a display device, such as a computer monitor or a touchscreen on a handheld computer device. The GUI may include various GUI widgets that organize what data is shown as well as how data is provided to a user. Furthermore, the GUI may provide data directly to the user, e.g., data provided as actual data values through text, or rendered by the computing device into a visual representation of the data, such as through visualizing a data model.

For example, a GUI may first obtain a notification from a software application requesting that a particular data object be provided within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be provided through various audio methods. In particular, data may be rendered into an audio format and provided as sound through one or more speakers operably connected to a computing device.

Data may also be provided to a user through haptic methods. For example, haptic methods may include vibrations or other physical signals generated by the computing system. For example, data may be provided to a user using a vibration generated by a handheld computer device with a predefined duration and intensity of the vibration to communicate the data.

The above description of functions presents only a few examples of functions performed by the computing system of FIG. 6A and the nodes and/or client device in FIG. 6B. Other functions may be performed using one or more embodiments of the invention.

While the disclosed technology has been described with respect to a limited number of embodiments, those skilled in the art, having benefit of this disclosed technology, will appreciate that other embodiments can be devised which do not depart from the scope of the disclosed technology as disclosed herein. Accordingly, the scope of the disclosed technology should be limited only by the attached claims.

What is claimed is:

1. A method for position reporting and navigating using a bullseye in an integrated flight application, the method comprising:
receiving, in a user interface of the integrated flight application executing on a portable computing device, a first selection of a location on a map displayed in the user interface;
receiving a second selection in the user interface to set the location as a bullseye;
obtaining, responsive to the first selection and the second selection, bullseye coordinates of the bullseye in a map reference frame,
wherein the map reference frame is associated with a map of the integrated flight application;
detecting, by the integrated flight application using a global positioning system (GPS) sensor of the portable computing device, current location coordinates in the map reference frame;
displaying, by the integrated flight application in a display of the portable computing device, the map with a bullseye located at the bullseye coordinates and a current location indicator superimposed on the map, wherein displaying the map uses the bullseye coordinates and the current location coordinates in the map reference frame;
transforming, by the integrated flight application, the current location coordinates in the map reference frame to current location coordinates in a bullseye reference frame;
displaying, in the user interface of the integrated flight application, a bullseye instrument listing the current location coordinates in the bullseye reference frame, the bullseye instrument being a popup box in the user interface;
receiving, in the bullseye instrument of the user interface of the integrated flight application, object coordinates in the bullseye reference frame;
determining the object coordinates in the map reference frame;
displaying, in the user interface of the integrated flight application, the map with an object indicator superimposed on the map, using the object coordinates in the map reference frame;
generating, by the integrated flight application, a flight plan from the current location to the object; and
displaying, in the user interface of the integrated flight application, the map with the flight plan superimposed on the map.

2. The method of claim 1, further comprising:
tracking the current location during the execution of the flight plan; and
storing the tracked current location.

3. The method of claim 1, wherein the bullseye coordinates are obtained from a user entering the bullseye coordinates.

4. The method of claim 1, wherein the map reference frame is based on one selected from a group consisting of a latitude/longitude representation and a military grid reference system (MGRS) representation.

5. The method of claim 1, wherein the bullseye reference frame is a polar reference frame using the bullseye as an origin.

6. The method of claim 1, further comprising sharing the bullseye coordinates to a secondary application, wherein the integrated flight application and the secondary application are hosted on different devices.

7. A system for position reporting and navigating using a bullseye in an integrated flight application, the system comprising:
a computer processor of a portable computing device; and
instructions executing on the computer processor, causing the system to:
receive, in a user interface of the integrated flight application executing on the portable computing device, a first selection of a location on a map displayed in the user interface;
receive a second selection in the user interface to set the location as a bullseye;
obtain, responsive to the first selection and the second selection, bullseye coordinates of the bullseye in a map reference frame, wherein the map reference frame is associated with a map of the integrated flight application;
detect, by the integrated flight application using a global positioning system (GPS) sensor of the portable computing device, current location coordinates in the map reference frame;

display, by the integrated flight application in a display of the portable computing device, the map with a bullseye located at the bullseye coordinates and a current location indicator superimposed on the map, wherein displaying the map uses the bullseye coordinates and the current location coordinates in the map reference frame;

transform, by the integrated flight application, the current location coordinates in the map reference frame to current location coordinates in a bullseye reference frame;

display, in the user interface of the integrated flight application, a bullseye instrument listing the current location coordinates in the bullseye reference frame, the bullseye instrument being a popup box in the user interface;

receive, in the bullseye instrument of the user interface of the integrated flight application, object coordinates in the bullseye reference frame;

determine the object coordinates in the map reference frame;

display, in the user interface of the integrated flight application, the map with an object indicator superimposed on the map, using the object coordinates in the map reference frame;

generate, by the integrated flight application, a flight plan from the current location to the object; and display, in the user interface of the integrated flight application, the map with the flight plan superimposed on the map.

8. The system of claim 7, further comprising a communication interface, and wherein the instructions further cause the system to share the bullseye coordinates to a secondary application, using the communication interface, wherein the secondary application is hosted on a secondary system.

9. A non-transitory computer readable medium comprising computer readable program code for causing a computer system to:

receive, in a user interface of the integrated flight application executing on a portable computing device, a first selection of a location on a map displayed in the user interface;

receive a second selection in the user interface to set the location as a bullseye;

obtain, responsive to the first selection and the second selection, bullseye coordinates of the bullseye in a map reference frame, wherein the map reference frame is associated with a map of the integrated flight application;

detect, by the integrated flight application using a global positioning system (GPS) sensor of the portable computing device, current location coordinates in the map reference frame;

display, by the integrated flight application in a display of the portable computing device, the map with a bullseye located at the bullseye coordinates and a current location indicator superimposed on the map, wherein displaying the map uses the bullseye coordinates and the current location coordinates in the map reference frame;

transform, by the integrated flight application, the current location coordinates in the map reference frame to current location coordinates in a bullseye reference frame;

display, in the user interface of the integrated flight application, a bullseye instrument listing the current location coordinates in the bullseye reference frame, the bullseye instrument being a popup box in the user interface;

receive, in the bullseye instrument of the user interface of the integrated flight application, object coordinates in the bullseye reference frame;

determine the object coordinates in the map reference frame;

display, in the user interface of the integrated flight application, the map with an object indicator superimposed on the map, using the object coordinates in the map reference frame;

generate, by the integrated flight application, a flight plan from the current location to the object; and display, in the user interface of the integrated flight application, the map with the flight plan superimposed on the map.

10. The non-transitory computer readable medium of claim 9, wherein the bullseye coordinates are obtained from a user entering the bullseye coordinates.

11. The non-transitory computer readable medium of claim 9, wherein the map reference frame is based on one selected from a group consisting of a latitude/longitude representation and a military grid reference system (MGRS) representation.

12. The non-transitory computer readable medium of claim 9, wherein the bullseye reference frame is a polar reference frame using the bullseye as an origin.

* * * * *